US009091550B1

(12) United States Patent
Smith (10) Patent No.: US 9,091,550 B1
(45) Date of Patent: Jul. 28, 2015

(54) GPS SHELLFISH TRAP SETTING SYSTEM (71) Applicant: John Smith, Newport, OR (US)

(72) Inventor: John Smith, Newport, OR (US)

( * ) Notice: Subject to any disclaimer, the term of this patent is extended or adjusted under 35 U.S.C. 154(b) by 0 days.

(21) Appl. No.: 14/293,767

(22) Filed: Jun. 2, 2014

(51) Int. Cl.
*A01K 69/08* (2006.01)
*G01C 21/00* (2006.01)
*G01C 21/20* (2006.01)
*G06M 3/00* (2006.01)

(52) U.S. Cl.
CPC .............. *G01C 21/203* (2013.01); *A01K 69/08* (2013.01); *G06M 3/00* (2013.01)

(58) Field of Classification Search
CPC ........ G01C 21/203; G06M 3/00; A01K 69/08
See application file for complete search history.

(56) References Cited

U.S. PATENT DOCUMENTS

| | | | | |
|---|---|---|---|---|
| 4,272,904 A * | 6/1981 | Francklyn | ........................ | 43/4.5 |
| 5,369,940 A * | 12/1994 | Soloman | ........................ | 53/501 |
| 6,243,649 B1 | 6/2001 | Wetherbee et al. | | |
| 6,567,792 B1 * | 5/2003 | Arnold | ............................ | 705/50 |
| 8,044,337 B2 * | 10/2011 | Duszynski | .................... | 250/221 |
| 8,190,337 B2 | 5/2012 | McClure et al. | | |
| 8,553,501 B1 | 10/2013 | Cota | | |
| 2006/0089794 A1 * | 4/2006 | DePasqua | ..................... | 701/208 |
| 2013/0109257 A1 | 5/2013 | Abulrassoul et al. | | |

* cited by examiner

*Primary Examiner* — Michael J Zanelli
(74) *Attorney, Agent, or Firm* — Stewart Myers (57) ABSTRACT

A GPS shellfish trap setting system that indicates when to set shellfish traps at precise locations with controllable distance between shellfish traps to allow for efficient shellfish fishing is provided herein. The shellfish trap setting system receives a GPS signal, processes that signal to determine the precise distance at which to launch a shellfish trap from a fishing vessel, then displays that distance to a control unit monitored by a user. The GPS shellfish trap setting system also includes counters for counting the number of traps set and the number of shellfish deposited into a holding tank.

20 Claims, 5 Drawing Sheets

GPS SHELLFISH TRAP SETTING SYSTEM

BACKGROUND OF THE INVENTION

The present invention relates to methods and apparatus used in the harvesting of shellfish from a fishery, and more specifically, methods and apparatus which employ Global Positioning Systems to properly place shellfish traps launched from a fishing vessel travelling through the fishery.

FIELD OF THE INVENTION

Commercial and other seamen often have need to place an object on the bottom of a body of water, or at least at some depth below the surface. An example of such is the placement of crab traps, lobster traps, and/or other marine animal traps on the bottom of a body of water. Conventionally, such traps are placed in what appears to be a likely location to make a catch, and left in place for a few days. The fisherman then returns to recover the trap and retrieve the catch (if any) therein.

Traditionally, such traps are marked by floats tethered to the trap by a line. The fisherman travels to the general location where the trap has been left, and seeks the floating marker buoy tethered to the trap. When the marker buoy is seen, the fisherman retrieves the buoy and hauls the trap to the surface by its tether line. While this technique is workable, it is not without its problems. One major problem with this system is that unscrupulous parties will often seek out such marker buoys and steal another fisherman's traps and any catch therein.

Another problem is that the float or buoy will often break away from its tether line, or the line will break away from the trap, due to rough weather, fouling in the propeller or trailing lines from another boat, or other reasons. When this occurs, the trap and any catch that might be contained therein are lost, with little chance of recovery. The fisherman might grapple for the trap if he has a good idea of its specific location, but it is unlikely that the trap would be recovered in such circumstances. Moreover, the use of a grapple in an attempt to recover the trap may result in damage to the underlying surface. This is of some concern, if the bottom is formed of a coral reef or other relatively fragile structure.

To accurately place and retrieve these traps, fisherman have been known to use timing devices to drop the traps based on speed. Unfortunately, this method does not allow for adverse weather conditions that may move the vessel from its plotted course, or at differing speeds in respect to the preferred speed. This can negatively affect the retrieval process, as the traps may not be placed where the vessel assumes they are. As a result, more and more fishermen have resorted to global positioning system (GPS) technology to properly place their traps. The Global Positioning System (GPS) is a satellite-based radio navigation system capable of providing continuous position, velocity, and time information to an unlimited number of users throughout the world. The global positioning system includes a satellite constellation in orbit around the earth. The satellites transmit orbit data. By measuring the ranges from the satellites to a low cost global positioning system receiver, the three-dimensional location of the receiver can be accurately located, provided that the signals from a plurality of satellites, typically four or more satellites, can be received.

Applications of GPS in vehicles, such as automobiles, trucks, vans, sport utility vehicles, minivans, and the like, have been developed. Examples of present applications of GPS to vehicles include automatic navigation systems for driver assistance in route guidance, intelligent vehicle highway systems for road tolling and traffic flow assessment and route diversions, as well as automatic vehicle location systems for monitoring a vehicle's position and movement which is provided to a fleet control center.

GPS is quite useful in determining one's position within several yards or meters. Such accuracy is quite helpful in allowing the fisherman to position his boat within a few yards of the target launch spot on the surface of the water. It would be beneficial to provide a solution that allows fishermen to position their boats near target launch spots, but also offers other features that make shellfish fishing easier for boat crews such as keeping track of launched pots and counting caught shellfish.

Methods for counting caught shellfish are known within the art. Generally, once the preferred species has been confirmed, the fisherman will send the specimen down a chute or conveyor and into a water-filled holding tank. One method of counting sees the fisherman counting the specimens by hand and keeping a revolving tally in mind until a time at which the tally can be totaled from all individuals. This can be inaccurate due to the extreme working environment encountered upon fishing vessels.

Another method sees the total weight of the haul measured by the average weight of the preferred species. The accuracy of this method can be upwards of 20-30% off from actual numbers. Another method sees a swinging trip wire en route to the holding tank, which may or may not count every specimen that passes. Often times, multiple specimens may pass through at the same instant, shorting the actual take. Salt water may also degrade the small mechanical parts to these systems, rendering them inoperable. It could be said there lies a need for a non-mechanical counting method to be implemented in salt-water environments. The present invention meets this need by providing a GPS-based system that alerts a fishing vessel's crew when the vessel has arrived at the desired launch point, counts the number of caught shellfish, and keeps track of the number of launched shellfish traps.

BRIEF SUMMARY OF THE INVENTION

The present invention provides a GPS shellfish trap setting system that indicates when to set shellfish traps at a precise distance from the last trap set within a fishery to allow for efficient fishing of crabs and lobsters. Many varieties of crabs and lobsters can be fished for using the present invention. The shellfish trap setting system receives a GPS signal, processes that signal to determine the precise distance at which to launch a shellfish trap from a fishing vessel, then displays that distance on a control unit monitored by a user. The GPS shellfish trap setting system also includes means for counting the number of traps set, for counting the number of traps retrieved from the fishery, and for counting the number of shellfish deposited into a holding tank.

The GPS shellfish trap setting system has components that record the number of shellfish traps set from the fishing vessel, the number of traps retrieved, and the number of shellfish caught by fishermen and deposited into a holding tank on the fishing vessel. Sensors within the system provide for the counting of traps and shellfish caught by vessels equipped with the system. The GPS shellfish trap setting system also generates an audible alert that alerts the fishermen when to launch a shellfish trap from the vessel.

In one preferred embodiment of the present invention, a GPS receiver receives GPS signals and transfers those signals to a microprocessor. The microprocessor receives the GPS signals and calculates the distance until the next trap must be launched. When traps must be launched, the microprocessor sends an actuation signal to an external sounder which generates a sound audible to a crew working on the fishing vessel and the microprocessor increments a set trap counter. When the crew pulls or a trap is "ran", meaning the trap is retrieved from the fishery, a micro switch attached to the hydraulic cylinder of a pot block, a device used on fishing vessels to retrieve traps from the fishery after they have been "soaking" and catching shellfish, sends a signal to the microprocessor. The microprocessor causes a retrieved trap counter to increment. The number of shellfish caught, launched traps, or retrieved traps is displayed to a user on a control unit of the system.

During shellfish trap retrieval, shellfish traps are brought onboard and shellfish are removed from the traps. The fishing vessel crew sorts the keepers, keepers being shellfish that meet the legal requirements for shellfish that can be caught in a particular fishery, from the non-keepers and deposit the keepers into a holding tank in the fishing vessel. As each keeper is deposited into the holding tank, a counting beam or a laser beam, hereinafter collectively referred to as the "counting beam", attached to the holding tank is triggered and a signal is sent to the microprocessor. Upon receiving the signal from the counting beam, the microprocessor increments a shellfish counter. The total number of shellfish deposited into the tank is displayed to the user on the control unit of the system.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the particular combination of all of its structures for the functions specified.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

In a manner described below, the data processing aspects of the present invention may be implemented, in part, by programs that are executed by a microprocessor. The term "microprocessor" as used herein includes any device that electronically executes one or more programs, such as personal computers (PCs), hand-held devices, multi-processor systems, microprocessor-based programmable consumer electronics, network PCs, minicomputers, mainframe computers, routers, gateways, hubs and the like. The term "program" as used herein includes applications, routines, objects, components, data structures and the like that perform particular tasks or implement particular abstract data types. The term "program" as used herein further may connote a single program application or module or multiple applications or program modules acting in concert. The data processing aspects of the invention also may be employed in distributed computing environments, where tasks are performed by remote processing devices that are linked through a communications network. In a distributed computing environment, programs may be located in both local and remote memory storage devices.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a GPS shellfish trap setting system that is used to precisely control the distance between shellfish traps when fishing for shellfish in a fishery. For the purpose of clarity, all like elements mentioned in this description will have the same designations. The terms "GPS shellfish trap setting system", "shellfish trap setting system", "system", "invention", and "present invention" may be used interchangeably. Furthermore, the terms "shellfish fishery", and "fishery" may be used interchangeably. The terms "infrared beam", "laser beam", and "counting beam" shall be used interchangeably and refer to a light-based beam located at the entrance of a shellfish sorting tank that is interrupted when shellfish enter the sorting tank. Terms referring to pulling a trap or running a trap such as "pull", "pulled" and "ran" shall be used interchangeably and shall refer to retrieving a shellfish trap from a fishery by bringing it onboard a fishing vessel. In addition to the functions, features, components, and abilities of the invention already discussed in this specification, the invention may also have, but not be limited to, the following features contained within the description below.

The present invention solves the shortcomings of the prior art by providing a GPS shellfish trap setting system used on fishing vessels to control the placement of shellfish traps placed in a fishery. The preferred embodiments described below set forth the present invention in greater detail.

The term shellfish, as used herein, refers to any species of crustacean harvested by people fishing in a fishery. Most commonly, the present invention will be used to fish for commercially viable crabs or lobsters in seas or oceans. There are many species and families of crabs and lobsters that may be caught using the GPS shellfish trap setting system but it is expected that species of crabs or lobsters used for food will be the most common type of shellfish caught using the present invention. The more commercially recognizable types of crabs and lobsters that may be caught with the present invention include, but are not limited to: Blue Crab, King Crab, Dungeness Crab, Horseshoe Crab, Peekytoe Crab, Stone Crab, Red King Crab, Alaskan King Crab, Rock Crab, Northern Lobster (Maine Lobster), Red Lobster, Sculptured Lobster, European Lobster, varieties of Scampi, Japanese Lobster, and Caribbean Lobster.

The term fishery is considered to be an area of water, typically an ocean or a sea, where shellfish are being raised or can be caught while in their natural habitat. Fisheries are areas where shellfish are harvested for their value, whether that value be a commercial, recreational, or subsistence value, and can consist of freshwater or saltwater environments. The present invention will work suitably well in any type of fishery where shellfish are found.

Figure 1:
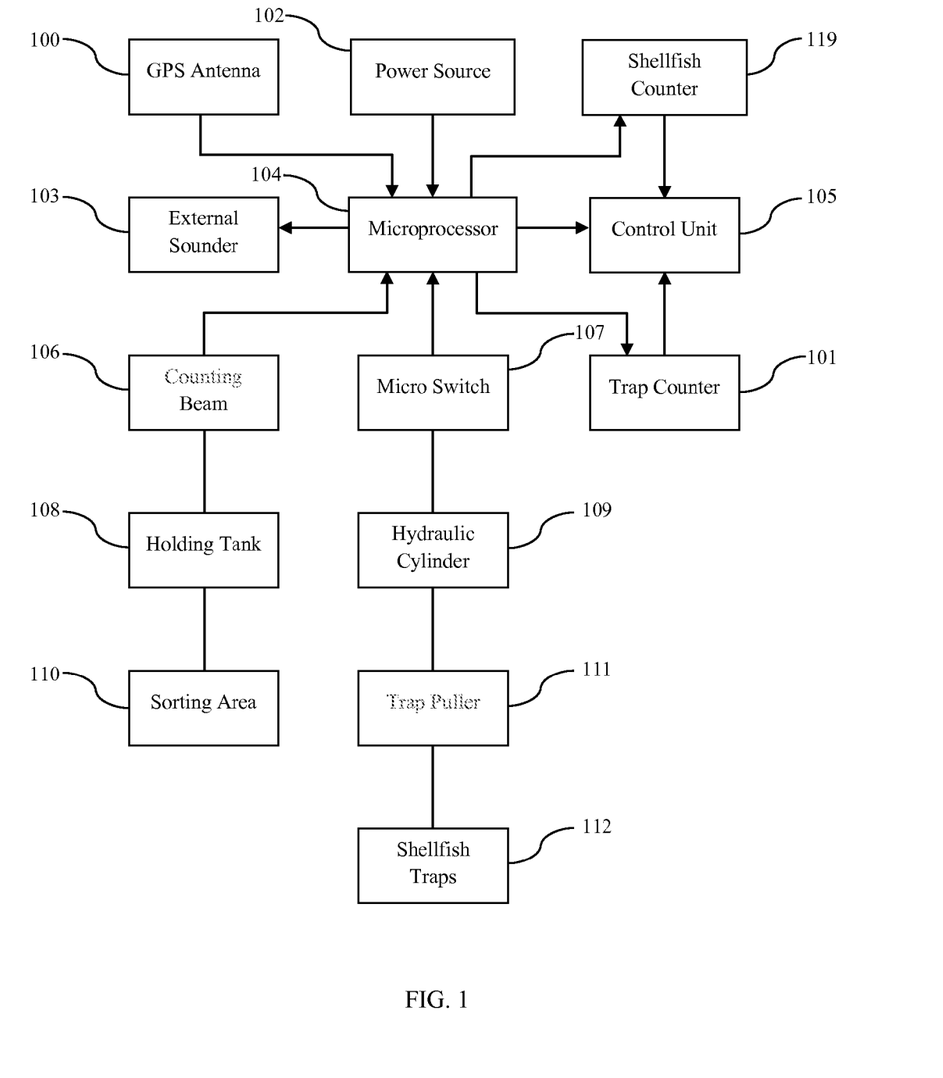
FIG. 1 shows a top level block diagram of the components of a GPS shellfish trap setting system as according to one embodiment of the present invention.

Referring now to FIG. 1, there is shown a top level block diagram of the components of a GPS shellfish trap setting system as according to one embodiment of the present invention. Connections between components are illustrated by lines and arrows within the block diagram. These connections can be simple electrical connections, or any connection capable of transmitting data, such as serial connections, data packet communications connections, or other means for transmitting digital or analog information. The data packets transmitted between some components of the system can include, but are not limited to, GPS data packets. Various protocols, such as the National Marine Electronics Association (NMEA) data protocol may be used to transmit data within the GPS shellfish trap setting system.

The GPS shellfish trap setting system comprises a GPS antenna (100) that receives global positioning system signals and transfers those signals to a microprocessor (104). The position of the GPS antenna (100) is the point in the system where GPS coordinates are received. The GPS antenna (100) can be positioned anywhere in the GPS shellfish trap setting system. In some embodiments of the present invention, the GPS coordinates received at the GPS antenna (100) represent the position of a fishing vessel (FIG. 5 (150)) carrying the system. When shellfish traps (112) are released, the system records the GPS coordinates at the position of the GPS antenna (100) as the point where the shellfish trap (112) was launched from the fishing vessel (FIG. 5 (150)).

Figure 5:
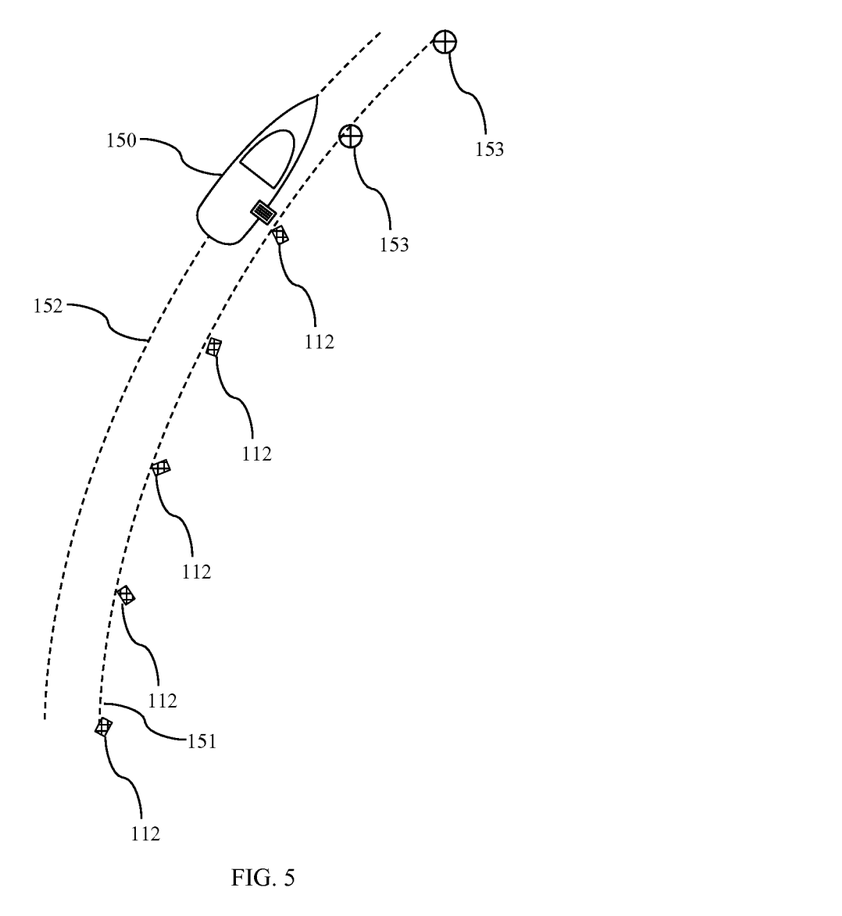
FIG. 5 shows a path of a fishing vessel equipped with a GPS shellfish trap setting system, a string of shellfish traps set using the GPS shellfish trap setting system, and desired launch points of shellfish traps where shellfish traps will be set using the GPS shellfish trap setting system as according to one embodiment of the present invention.

In other embodiments of the present invention, calculations must be made to compensate for the offset from where the GPS antenna (100) is placed on the fishing vessel (FIG. 5 (150)) to the point where traps (112) are released from the vessel (FIG. 5 (150)). Compensating for the GPS antenna (100) offset includes compensating for the distance of the GPS antenna (100) in front of or behind where the traps (112) are launched, as well as the distance of the GPS antenna (100) left or right of where the traps (112) are launched. The compensation calculations will correct for any positional deviation caused by the GPS antenna's (100) position relative to the point of trap (112) release.

The GPS shellfish trap setting system further comprises a trap counter (101) that counts the number of shellfish traps (112) launched from the fishing vessel (FIG. 5 (150)) and the number of traps (112) retrieved, pulled, in a string from the fishery. It is important to note that the trap counter (101) has two modes: one that records the number of launched traps (112), and one that records the number of retrieved traps (112). The GPS shellfish trap setting system determines the appropriate location to launch a trap (112). It should be noted that the procedure used to determine the appropriate location to launch a trap (112) is discussed in detail below. When the fishing vessel (FIG. 5 (150)) arrives at the appropriate location, the microprocessor (104) sends a signal to an external sounder (103) that generates a sound to alert the crew to launch a trap (112).

A shellfish trap (112), as used with the present invention, is any device used to catch shellfish in a fishery and includes many types of crab pots or lobster pots. The exact size and structure of the shellfish trap (112) varies depending on the type of shellfish being harvested. Crab pots are commonly metal frames, round or rectangular, covered by a mesh that forms an interior area in which crabs are trapped. Lobster pots are usually constructed of wire or wood, or a combination of both, have mesh that surrounds its frame, and an opening that allow a lobster to enter a tunnel of netting. Some lobster pots are divided into two areas, a chamber where bait is located, and a parlour where lobsters are trapped. Fishing vessels (FIG. 5 (105)) can carry a few, or many hundreds of shellfish traps depending on the size of the vessel (FIG. 5 (105)).

After the external sounder (103) has been activated, a trap launcher mounted on the fishing vessel (FIG. 5 (150)), containing a platform upon which a shellfish trap (112) is loaded so that it may be launched over the side of the fishing vessel (FIG. 5 (150)) is partially elevated. Elevating one side of the trap launcher causes the shellfish trap (112) to slide over the side of the vessel (FIG. 5 (150)) and into the water. In some embodiments of the present invention, the fishing vessel's crew manually launch a trap (112) without the aid of a trap launcher. When the external sounder (103) has been activated, the crew causes the trap launcher to elevate and the trap (112) is launched. When the external sounder (103) has been activated, the trap counter is incremented regardless of whether the trap (112) was launched from a trap launcher or manually by the crew of the fishing vessel (FIG. 5 (150)).

The present invention also counts the traps (112) that have been soaking in the fishery and are retrieved to extract shellfish. During retrieval, or pulling, of the shellfish traps (112), a micro switch (107) is attached to a trap puller (111), or pot block. A trap puller (111), or pot block, hereinafter referred to as a "trap puller" is a device used on a fishing vessel that commonly uses hydraulics to retrieve a shellfish trap (112) from a fishery by winding a rope or line attached to the shellfish trap around a hydraulic cylinder (109). The micro switch (107) is activated and outputs a signal to the microprocessor (104) when the trap puller's (111) hydraulic cylinder (109) is activated. The trap puller (111) also makes use of a pulley through which the line attached to the shellfish trap (112) passes as it is being pulled back onboard the fishing vessel (FIG. 5 (150)).

When a shellfish trap (112) is pulled, the micro switch (107) outputs the signal to the microprocessor (104), the microprocessor (104) increments the trap counter (101) to show that another trap has brought back onboard the fishing vessel (FIG. 5, (150)). The count of the number of shellfish traps (112) launched is viewable by a user through a trap counter display (FIGS. 2, 3 (124)) located on a control unit (105).

The GPS shellfish trap setting system is connected to a power source (102) that provides electrical energy to run the system. The power source (102) can be the fishing vessel's (FIG. 5 (150)) power system, in which case the power source (102) would most likely provide 12-volt DC to the GPS shellfish trap setting system, or can be a power source (102) independent of the fishing vessel's (FIG. 5 (150)) electrical system that can provide other voltages or currents. In these other embodiments, the power source (102) may be an onboard generator, or a dedicated battery.

When the fishing vessel (FIG. 5 (150)) retrieves the shellfish traps (112) from the shellfish fishery, the traps (112) are taken on the fishing vessel (FIG. 5 (150)) and shellfish from the traps (112) are deposited into a sorting area (110). The sorting area is where shellfish are examined to determine if they are keepers. Keepers are shellfish that are deemed suitable for harvesting and meet regulations for being harvested from a particular fishery, such as being the correct species, sex and meet a minimum size requirement. Each fishery may have its own set of regulations that set the standard for which shellfish may be considered a keeper, and which shellfish are not keepers. Those shellfish that are not keepers are typically returned to the fishery. The sorting area (110) of a fishing vessel (FIG. 5 (150)) may be an individual component, such as a sorting table, or, on smaller vessels, may simply be an area where the crew can examine shellfish while still in the trap (112). The sorting area (110) for purposes of the present invention is any area where the determination of whether a shellfish is a keeper or not a keeper is made.

Shellfish that are found to be keepers are deposited in a holding tank (108). The holding tank (108) allows shellfish to be stored live until the fishing vessel (FIG. 5 (150)) returns to shore. The holding tank provides an environment for the shellfish to live while fishing continues, or the fishing vessel (FIG. 5 (150)) is in transit and are usually filled with fresh or salt water, depending on the type of shellfish being harvested.

Shellfish enter the holding tank (108) through a tube or opening at the top of the tank (108). The opening of the tube is usually close to the sorting area (110) so that the crew can easily deposit shellfish into the tank (108) after sorting. When shellfish pass through the tube and into the holding tank (108), a counting beam (106) is triggered and a signal is sent to the microprocessor (104) indicating that a shellfish has been deposited into the tank (108). The microprocessor (104) increments a shellfish counter 119 that records the number of shellfish caught by the fishing vessel (FIG. 5 (150)). The number of caught shellfish is displayed to a user through a shellfish counter display (FIG. 2 (122)) on the control unit (105). Recording the number of shellfish caught allows users to know if they have met their fishing quota, which is particularly useful for fishermen operating under the Individual Fishing Quota (IFQ) system. Knowing the total number of shellfish caught also allows users to estimate the value of their catch, and to avoid exceeding any regulatory maximums or limits that may exist for the shellfish being harvested. Users also know when it is time to return to shore for off-loading when their shellfish counter (119) indicates they are at capacity or have met their fishing goal.

The GPS shellfish trap setting system displays information to a user through a control unit (105) that receives information from the microprocessor (104). The information displayed on the control unit (105) includes the distance until the next trap (112) launch, the number of traps already launched, the number of shellfish caught, and the number of traps ran in a string. The control unit (105) also allows users to quickly increase or decrease distance between trap (112) placements, and to reset the shellfish counter (FIG. 2 (119)) and trap counter (101). In some embodiments, the control unit (105) is a stand-alone device with system-specific displays or indicators.

Data processing in the GPS shellfish trap setting system is performed by the microprocessor (104). The microprocessor (104) receives information from one or more components of the GPS shellfish trap setting system, performs calculations on the received information, and outputs signals to one or more components of the GPS shellfish trap setting system. In one embodiment of the present invention, the microprocessor (104) receives information from the GPS antenna (100), calculates where traps (112) must be launched by determining the distance between traps (112) and comparing that distance to the fishing vessel's (FIG. 5 (105)) current position, then outputs actuation signals to the external sounder (103) when the fishing vessel (FIG. 5 (105)) reaches the location where a trap (112) must be placed.

The microprocessor (104) executes computer instructions (FIG. 4) that are written to perform the functions required by the GPS shellfish trap setting system. These functions include determining the location to drop traps (112) and the time at which the traps (112) must be launched from the trap launcher. The microprocessor (104) can be a single, multifunction data processing unit, or, in some embodiments of the present invention, may comprise a plurality of microprocessors (104) such as a GPS information processor that receives and processes GPS coordinates, and a program execution processor. For purposes of the present invention, the microprocessor (104) is a single, or a collection of data processing devices, that execute machine-implemented instructions written to control functions of the GPS trap shellfish trap setting system.

Figure 2:
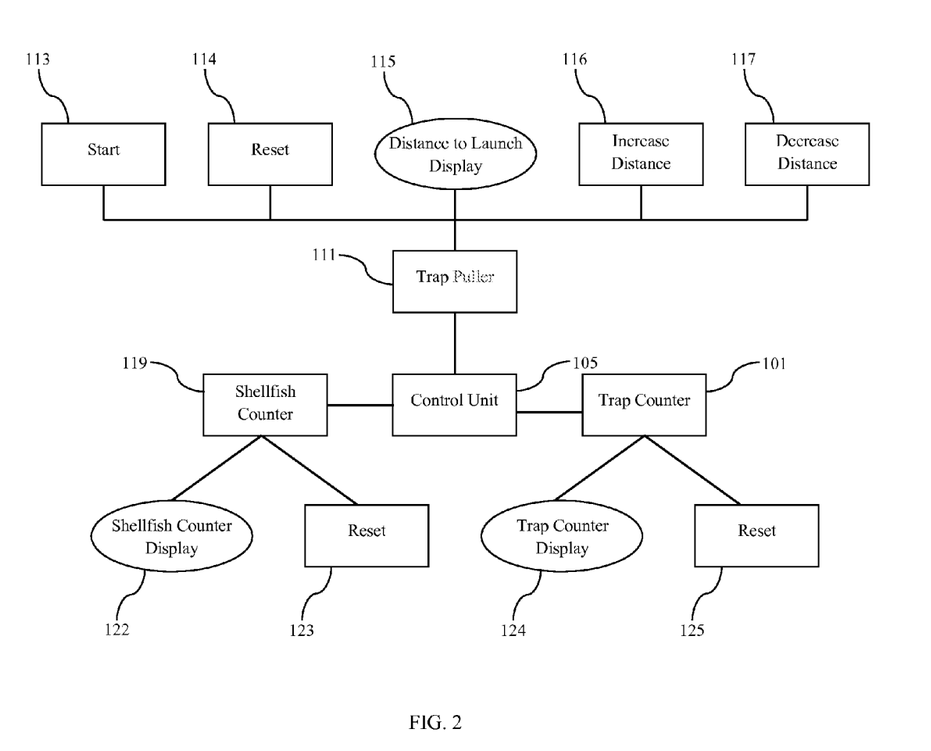
FIG. 2 shows a block diagram of the control unit of a GPS shellfish trap setting system as according to one embodiment of the present invention.

Referring now to FIG. 2, there is shown a block diagram of the control unit (105) of a GPS shellfish trap setting system as according to one embodiment of the present invention. The control unit (105) controls functionality for three primary system elements: the trap launcher, the shellfish counter (119), and the trap counter (101). When pulling traps (FIGS. 1, 5 (112)), the control unit (105) receives a signal from the micro switch (FIG. 1 (107)) that is connected to the trap puller indicating a trap has been retrieved from the fishery. When a signal is received from the micro switch (FIG. 1 (107)), the retrieved trap counter is incremented.

The control unit (105) displays the distance to the next trap launch point to the user through a distance to launch display (115). The distance to the launch point can be displayed in a variety of measurements, including feet, yards, or meters to the next launch point. The default setting will be to display the number of feet to the next launch point.

A user can start the distance to launch display (115) by activating a start control (113), can reset the distance to launch display (115) by activating a reset control (114), and can increase the distance or decrease the distance between traps (FIGS. 1, 5 (112)) by activating an increase distance control (116) or decrease distance control (117). The reset control (114) can be used in embodiments of the invention that do not have a micro switch (FIGS. 1 (107) attached to the trap launcher to indicate when a trap (FIGS. 1, 5 (112)) is launched. The increase distance control (116) and decrease distance control (117) are used to increase the unit of distance measurement between trap (FIGS. 1, 5 (112)) launches. In some embodiments, activating the increase distance control (116) or decrease distance control (117) will increase or decrease the number of feet between trap (FIGS. 1, 5 (112)) launches. In other embodiments, activating the increase distance control (116) or decrease distance control (117) will increase or decrease the number of meters between trap (FIGS. 1, 5 (112) launches.

The control unit (105) contains a shellfish counter (119) that records the number of shellfish placed into the holding tank (FIG. 1 (108)) and displays that number to the user through a shellfish counter display (122). The shellfish counter display (122) can be used to monitor whether the user has met their fishing quota, and to ensure that the user is not exceeding regulatory limits for the number of shellfish caught. The user can reset the shellfish counter (119) by activating a shellfish counter reset control (123). The shellfish counter reset control (123) is commonly used to reset the shellfish counter (119) after off-loading shellfish, or before setting out for a new fishing trip.

The control unit (105) contains a trap counter (101) that records the number of traps (FIGS. 1, 5 (112)) launched from the fishing vessel (FIG. 5 (150)) and displays that number to the user through a trap counter display (124). The trap counter display (124) can be used to monitor the total number of traps (FIG. 1, 5 (112)) that a user has placed during their fishing excursion. The user can reset the trap counter (101) by activating a trap counter reset control (125). The trap counter reset control (125) is commonly used to reset the trap counter (101) once all traps (FIG. 1, 5 (112)) have been retrieved.

Figure 3:
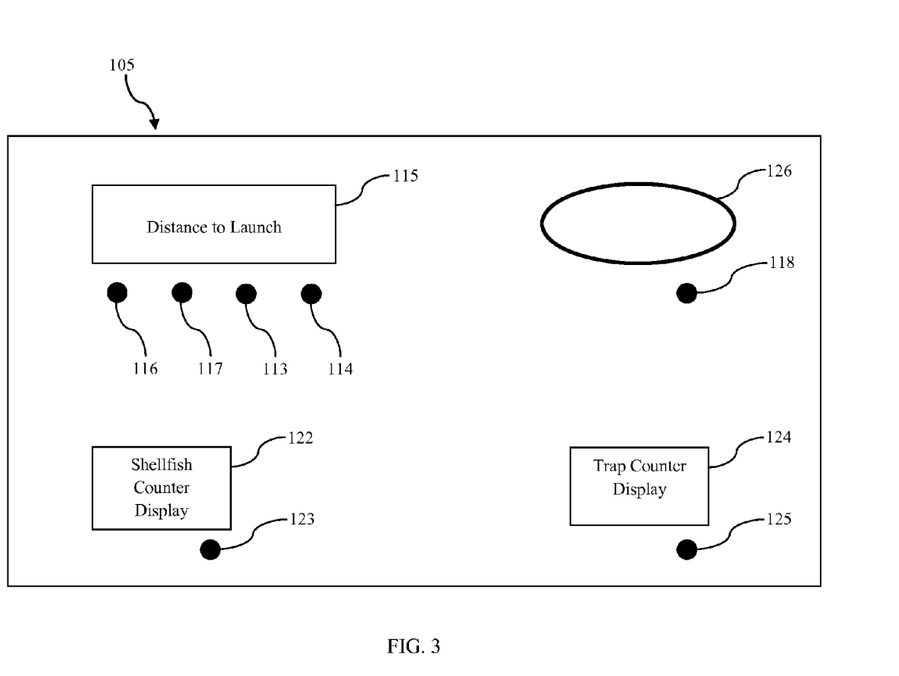
FIG. 3 shows the layout of a control unit of a GPS shellfish trap setting system as according to one embodiment of the present invention.

Referring now to FIG. 3, there is shown the layout of a control unit (105) of a GPS shellfish trap setting system as according to one embodiment of the present invention. The control unit (105) contains distance to launch display (115) that displays the distance until the next trap (FIGS. 1, 5 (112)) launch point. Controls to start (113) the distance to launch display, reset (114) the distance to launch display, increase the distance (116) between trap (FIGS. 1, 5 (112)) launches, or decrease the distance (117) between trap (FIGS. 1, 5 (112)) launches are provided on the control unit (105).

The control unit (105) contains the shellfish counter display (122) and the trap counter display (124) so that a user can efficiently monitor the number of shellfish caught and the number of traps (FIGS. 1, 5 (112)) placed in the fishery. Resets to reset the shellfish counter display (122) and trap counter display (124) are also provided (123, 125 respectively).

The control unit (105) also contains a manufacturer's logo (126) that identifies the manufacturer of the GPS shellfish trap setting system. The logo (126) helps the manufacturer promote brand identity for the system.

The control unit (105) has a system power control (118) that allows a user to activate or deactivate the system. The system power control (118) can be a simple on/off switch, or a switch that toggles the system between a ready or standby mode.

Figure 4:
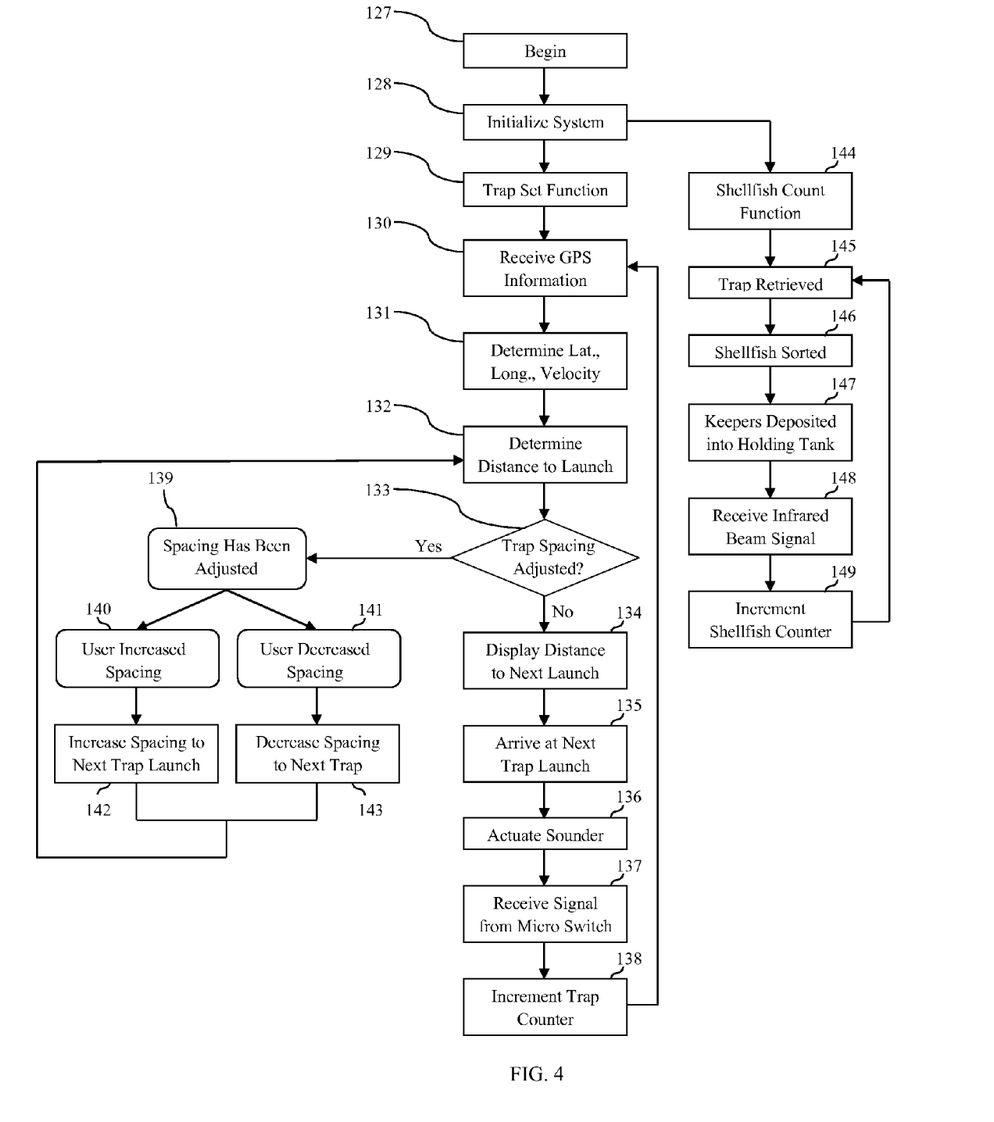
FIG. 4 shows a flowchart of the functions and subfunctions of a GPS shellfish trap setting system as according to one embodiment of the present invention.

Referring now to FIG. 4 there is shown a flowchart of the functions and subfunctions of a GPS shellfish trap setting system as according to one embodiment of the present invention. The system begins (127) with an initialize system command (128). System initialization (128) includes setting all counters to zero, resetting displays, and initializing system sensors. After system initialization (128), two functions begin: the shellfish count function (144), and the trap set function (129). The shellfish count function (144) waits until a trap is retrieved (145) from a fishery. When the trap is retrieved (145) the micro switch (FIG. 1 (107)) connected to the hydraulic cylinder (FIG. 1 (109)) of the trap puller (FIGS. 1, 2 (111)) sends a signal to the microprocessor (FIG. 1 (104)) causing the trap counter (FIG. 1 (101)) to record that another trap (FIGS. 1, 5 (112)) has been brought onboard the fishing vessel. Retrieving a trap (145) occurs when a shellfish trap (FIGS. 1, 5 (112)) is brought onboard the fishing vessel (FIG. 5 (150)). The shellfish trap (FIGS. 1, 5 (112)) has been allowed to reside in the fishery for a period of time so that shellfish could enter the shellfish trap (FIGS. 1, 5 (112)).

After the trap (FIGS. 1, 5 (112)) is retrieved (145) and the trap counter (FIG. 1 (101)) is incremented to record that the trap (FIGS. 1, 5 (112)) has been pulled, shellfish are sorted (146) in the fishing vessel's (FIG. 5 (150)) sorting area (FIG. 1 (110)). Keepers, those shellfish that meet or exceed a fishery's regulatory requirements for which shellfish can be caught in the fishery, are deposited into the fishing vessel's holding tank (147). Those shellfish that are not keepers are returned to the fishery, most commonly by being thrown over the side of the fishing vessel (FIG. 5 (150)).

When the keepers are deposited into the fishing vessel's holding tank (147), a counting beam (FIG. 1 (106)) at the mouth or intake tube of the holding tank (FIG. 1 (108)) is broken. The shellfish count function (144) receives a signal that the counting beam has been broken (148). After receiving that signal, the shellfish count function (144) increments a shellfish counter (149). The shellfish counter (149) records the number of keepers that have been deposited into the fishing vessel's holding tank (147). The count of the number of shellfish deposited into the holding tank (147) is displayed to a user on the control unit's shellfish counter display (FIG. 3 (122)).

The second function to run after system has been initialized (128) is the trap set function (129). The trap set function (129) begins by receiving GPS information (130) from the system's GPS antenna (FIG. 1 (100)). The GPS information received (130) is parsed to determine the fishing vessel's (FIG. 5 (150)) latitude, longitude, and velocity (131). Determining the fishing vessel's (FIG. 5 (150)) latitude, longitude, and velocity (131) provides the system with the fishing vessel's (FIG. 5 (150)) present position, speed, and direction of travel.

After determining the fishing vessel's (FIG. 5 (150)) latitude, longitude, and velocity (131), the trap set function (129) determines the distance to the next shellfish trap launch point (132).

When determining the distance to the next shellfish trap launch point (132), the trap set function (129) compares the fishing vessel's (FIG. 5 (150)) present position to a shellfish trap distance interval and subtracts the two values. The resultant is the distance to the next launch point. This shellfish trap distance interval is a value that can be set by a user, or is a system default distance, that is the desired distance between launch points for the shellfish traps (FIGS. 1, 5 (112)). When fishing for shellfish, proper trap spacing is important to increase the probability that one or more of the traps will fall into an area heavily populated by shellfish. Furthermore, proper spacing between traps can increase catch frequency. Some studies have shown that the presence of crabs in a crab pot will decrease the probability of catching crabs in another pot if the other pot is too close. The shellfish trap (FIGS. 1, 5 (112)) spacing interval can be measured in any distance unit, but will most commonly be measured in feet, meters, or yards.

A user can adjust the shellfish trap spacing to properly control how far apart shellfish traps (FIGS. 1, 5 (112)) are launched. The trap set function (129) checks to see if the user has adjusted the trap spacing (133). If the trap spacing has been adjusted (139), the trap set function checks to see if the user has increased the spacing (140), or decreased the spacing (141). If the user increased the spacing (140), the trap set function (129) increases the spacing to the next trap launch (142) then resumes the trap set by determining the distance to the next trap launch (132) using the increased trap spacing value. If the user decreased the spacing (141), the trap set function (129) decreases the spacing to the next trap launch (143) then resumes the trap set function by determining the distance to the next trap launch (132) using the decreased trap spacing value.

If the user did not adjust the trap spacing, or if the user has completed adjusting the trap spacing, the distance to the next launch is displayed to the user (134) on the system's control unit (FIGS. 1, 2, 3 (105)). Some embodiments of the present invention allow the user to change the units of measurement used when displaying the distance to launch. A user is able to toggle between displaying the distance to launch in feet, meters, yards, miles, and so on.

When the fishing vessel (FIG. 5 (150)) arrives at the next trap launch point (135), the system actuates an external audible sounder (136). The external audible sounder (FIG. 1 (103)) alerts the fishing vessel's crew that it is time to launch a shellfish trap (FIGS. 1, 5 (112)). The crew then launches a shellfish trap (FIGS. 1, 5 (112)) from the fishing vessel's trap launcher (FIGS. 1, 2 (111)), or manually, into the fishery. When a shellfish trap (FIGS. 1, 5 (112)) is launched, the trap counter is incremented (138) to record that another trap (FIGS. 1, 5 (112)) has been set in the fishery. The microprocessor (FIG. 1, (104)) increments the trap counter (138). The trap counter (FIGS. 1, 2 (101)) records the number of shellfish traps (FIGS. 1, 5 (112)) that have been launched from the fishing vessel (FIG. 5 (150)) into the fishery and the number of traps (FIGS. 1, 5 (112)) that have been pulled from the fishery. Information from the trap counter (FIGS. 1, 2 (101)), the number of traps set or the number of traps pulled, is displayed to the user on the control unit's trap counter display (FIGS. 2, 3 (124)).

Once the trap counter has been incremented (138), the trap set function (129) continues by receiving GPS information (130) in preparation for the next trap launch sequence.

Referring now to FIG. 5, there is shown a path of a fishing vessel (152) equipped with a GPS shellfish trap setting system, a string of shellfish traps set using the GPS shellfish trap setting system (151), and desired launch points of shellfish traps (153) where shellfish traps (112) will be set using the GPS shellfish trap setting system as according to one embodiment of the present invention.

The fishing vessel (150) can travel along any path (152) in a fishery when setting shellfish traps (112). The GPS shellfish trap setting system allows the fishing vessel (150) to set shellfish traps (112), with the correct spacing, along its path (152). The GPS shellfish setting system is able to determine the location of desired launch points (153) along the path of the fishing vessel (150) and will alert the user and crew when it is time to launch a shellfish trap (112) once the fishing vessel (150) arrives at the desired launch point (153). The string of traps set (151) is set with correct spacing because of the present invention.

There is described and illustrated a new and improved GPS shellfish trap setting system, generally denominated herein. The inventive portions of the shellfish trap setting system include several subsystems that, when taken together, constitute an embodiment of the present invention. The above detailed description sets forth rather broadly the more important features of the present invention in order that its contributions to the art may be better appreciated.

As such, those skilled in the art will appreciate that the conception, upon which disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

At least some of the above described example methods and/or apparatus may be implemented by one or more software and/or firmware programs running on a computer processor. However, dedicated hardware implementations including, but are not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should be noted that the example software and/or firmware implementations described herein may be optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of this disclosure are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of this invention.

Directional terms such as "front", "forward", "back", "rear", "in", "out", "downward", "upper", "lower", "top", "bottom", "upper", "lower" and the like may have been used in the description. These terms are applicable to the embodiments shown and described herein. These terms are merely used for the purpose of description and do not necessarily apply to the position in which components or items within the present invention may be used.

Therefore, the foregoing is considered as illustrative only of the principles of a GPS shellfish trap setting system. Further, since numerous modifications and changes will readily occur to those skilled in the art, it is not desired to limit the GPS shellfish trap setting system to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

I claim:

1. An apparatus for placing shellfish traps comprising:
a GPS antenna that receives GPS information, the GPS antenna being connected to a microprocessor;
a trap counter that records the number of shellfish traps launched from a fishing vessel that is incremented for every shellfish trap that is launched from the fishing vessel, the trap counter being connected to the microprocessor;
the trap counter also recording the number of shellfish traps retrieved from a fishery;
a control unit that displays information to a user, the control unit being connected to the microprocessor;
wherein the microprocessor receives the GPS information from the GPS antenna; parses the GPS information to determine latitude, longitude and velocity of the fishing vessel, the latitude and longitude of the fishing vessel being considered its present position; calculates the distance to the next shellfish trap launch position by comparing the fishing vessel's present position to a shellfish trap distance interval and subtracting the two values, the resultant being the distance to the next shellfish trap launch position; displays the distance to the next shellfish trap launch position to the user on a distance to launch display;
wherein an increase distance control and a decrease distance control allows the user to increase or decrease the spacing between shellfish trap launch positions; the microprocessor adding the distance increased by the user using the increase distance control or subtracting the distance decreased by the user using the decrease distance control from the distance to the next shellfish trap launch position to determine a new next shellfish trap launch position;
and wherein the control unit displays the number of shellfish traps launched from the fishing vessel and the distance to the new next shellfish trap launch position after increasing or decreasing the distance to the next shellfish trap launch position if the user has increased or decreased the spacing between shellfish trap launch positions.

2. The apparatus of claim 1, further comprising a shellfish counter that records the number of shellfish deposited into a holding tank on the fishing vessel, the shellfish counter being connected to the microprocessor.

3. The apparatus of claim 2, wherein the number of shellfish deposited into the holding tank is displayed to the user on the control unit.

4. The apparatus of claim 2, wherein shellfish deposited into the holding tank on the fishing vessel interrupts a counting beam, and the interruption of the counting beam causes the shellfish counter to be incremented.

5. The apparatus of claim 1, wherein shellfish traps are retrieved from the fishery using a trap puller; the trap puller having a hydraulic cylinder and a micro switch attached to the hydraulic cylinder.

6. The apparatus of claim 5, wherein the micro switch outputs a signal to the microprocessor when a trap is pulled, the signal causing the microprocessor to increment the trap counter.

7. The apparatus of claim 1, wherein the control unit has controls to increase or decrease the distance to the next shellfish launch position, the controls being connected to the microprocessor.

8. A GPS shellfish trap setting system for setting shellfish traps in a fishery as a fishing vessel travels along a path through the fishery, the system comprising:
a microprocessor that receives information from a GPS antenna and parses the received GPS information to determine the latitude and longitude of the fishing vessel;
the microprocessor also being capable of determining the next launch point for a shellfish trap;
a shellfish trap counter that records the number of shellfish traps launched from the fishing vessel or pulled from a fishery, the shellfish trap counter being incremented every time a shellfish trap is launched from the fishing vessel or brought back onboard the fishing vessel, the shellfish trap counter being connected to the microprocessor;
a shellfish counter that records the number of shellfish caught by the fishing vessel, the shellfish counter being incremented every time a shellfish is placed into a holding tank on the fishing vessel, the shellfish counter being connected to the microprocessor;
a control unit that displays to the user: the distance to the next launch point for a shellfish trap, the shellfish trap counter, and the shellfish counter;
controls that allow the user to increase or decrease the distance between shellfish trap launch points, the controls being connected to the microprocessor;
a reset controls that allows the user to reset the shellfish trap counter or the shellfish counter, the reset control being connected to the shellfish trap counter; and
an external sounder connected to the microprocessor that receives actuation signals from the microprocessor and emits an audible sound that alerts the fishing vessel's crew to launch a shellfish trap when the fishing vessel arrives at the next launch point for a shellfish trap.

9. The GPS shellfish trap setting system of claim 8, wherein the microprocessor executes computer instructions, the computer instructions being written to perform the functions required by the GPS shellfish trap setting system.

10. The GPS shellfish trap setting system of claim 8, wherein the GPS information received by the microprocessor from the GPS antenna is transferred to the microprocessor in National Marine Electronics Association data packets.

11. The GPS shellfish trap setting system of claim 8, wherein the control unit is connected to the microprocessor and contains the controls that allow the user to increase or decrease the distance between shellfish trap launch points and the reset controls that allows the user to reset the shellfish trap counter or the shellfish counter.

12. The GPS shellfish trap setting system of claim 8, wherein the microprocessor calculates the distance to the next launch point for a shellfish trap when a user increases or decreases the distance to the next launch point.

13. The GPS shellfish trap setting system of claim 8, further comprising a micro switch attached to a hydraulic cylinder of a shellfish trap puller, the micro switch being connected to the microprocessor and outputs a signal to the microprocessor when a shellfish trap is pulled, the signal causing the microprocessor to increment the shellfish trap counter.

14. The GPS shellfish trap setting system of claim 8, further comprising a counting beam attached to the opening of the holding tank that sends a signal to the microprocessor when shellfish pass through the opening, the signal causing the microprocessor to increment the shellfish counter.

15. A method for setting shellfish traps in a fishery as a fishing vessel travels along a path through the fishery comprising:
   receiving GPS information from a GPS antenna;
   parsing the GPS information for latitude and longitude;
   determining a present position of the fishing vessel from the parsed latitude and longitude;
   determining a next shellfish trap launch position by comparing the fishing vessel's present position to a shellfish trap distance interval;
   allowing a user to increase or decrease the shellfish trap distance interval;
   recalculating the next shellfish trap launch position if the user increased or decreased the shellfish trap distance interval;
   displaying the distance to the next shellfish trap launch position to the user;
   actuating an external sounder that alerts the fishing vessel's crew to launch a shellfish trap when the fishing vessel reaches the next shellfish trap launch position;
   incrementing a shellfish trap launch counter every time a shellfish trap is launched;
   incrementing a shellfish counter every time a shellfish is placed into a holding tank on the fishing vessel; and
   displaying the number of shellfish traps launched from the fishing vessel and the number of shellfish placed into the holding tank to the user.

16. The method of claim 15, wherein the shellfish trap launch counter is incremented by a microprocessor when the microprocessor determines that the fishing vessel has arrived at the next shellfish trap launch position.

17. The method of claim 15, wherein the shellfish counter is incremented by a microprocessor when the microprocessor receives a signal sent from a counting beam that is attached to the opening of the holding tank.

18. The method of claim 15, further comprising displaying the recalculated distance to the shellfish trap launch position if the user has incremented or decremented the shellfish trap distance interval.

19. The method of claim 15, wherein the external sounder is actuated automatically, the actuation signal being sent by the microprocessor after the microprocessor determines that the fishing vessel has reached the next shellfish trap launch position.

20. The method of claim 15, further comprising providing controls that allow the user to reset the shellfish trap counter or the shellfish counter.

\* \* \* \* \*